Patented Jan. 1, 1924.

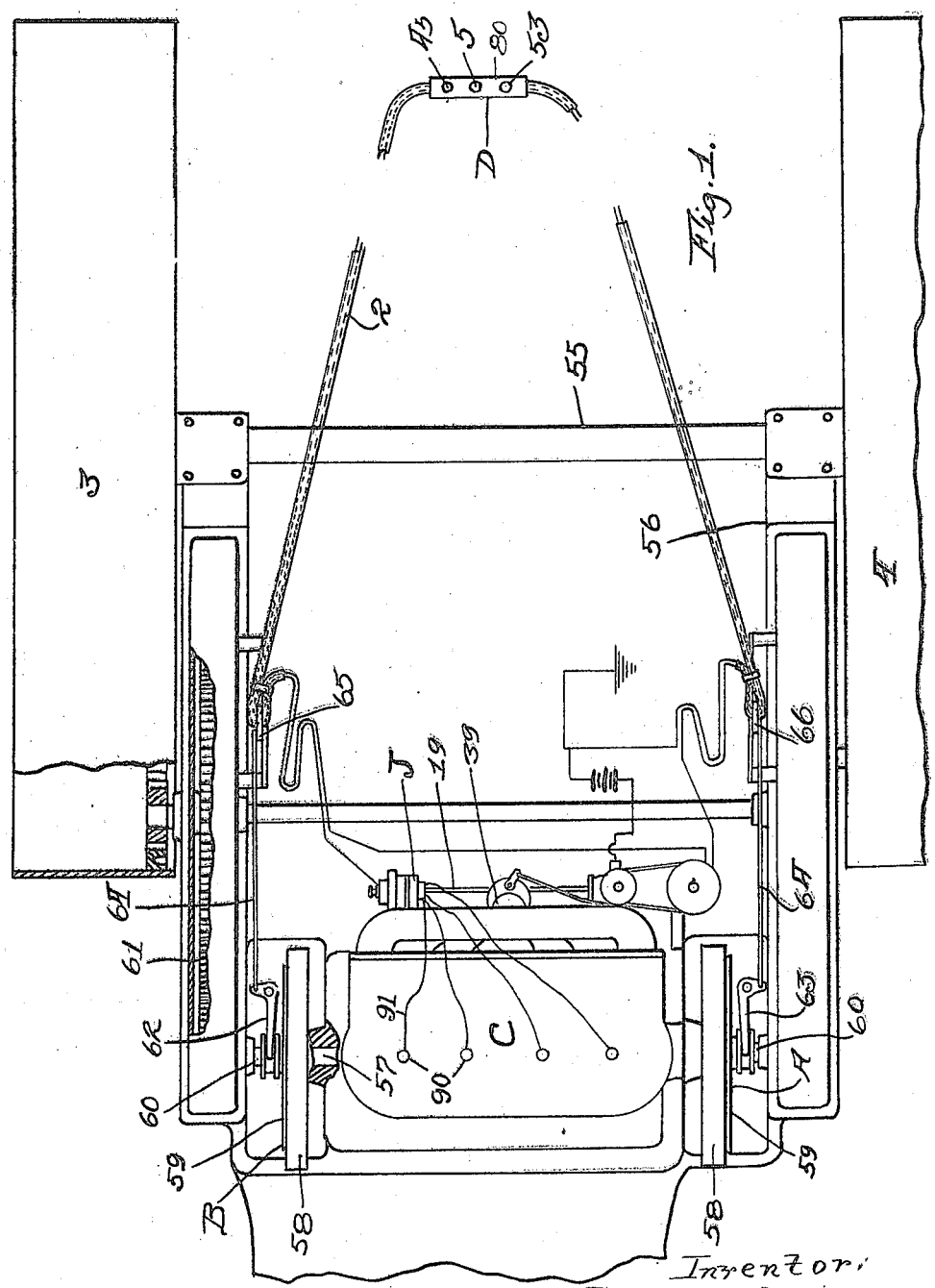

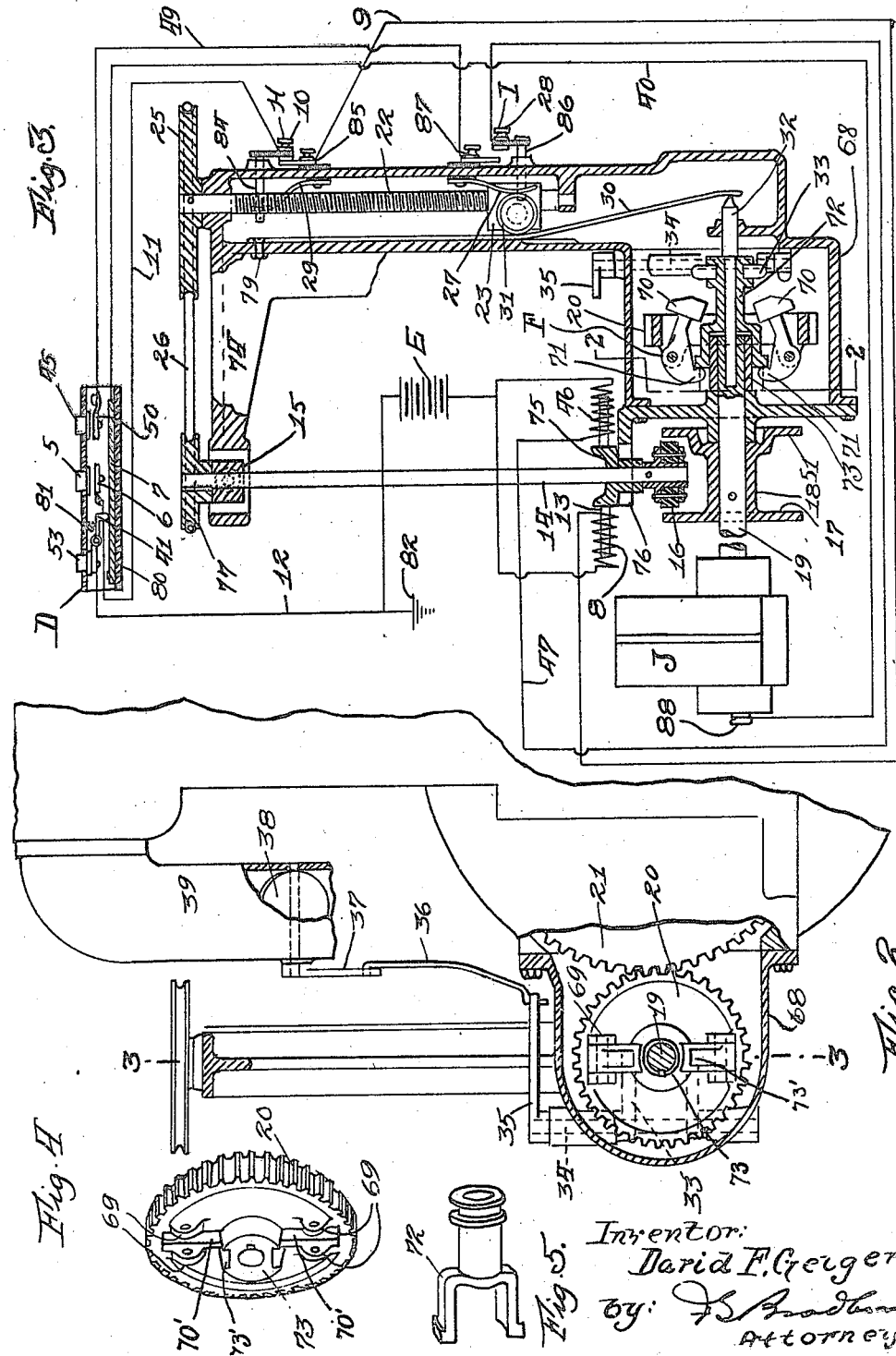

1,478,996

UNITED STATES PATENT OFFICE.

DAVID F. GEIGER, OF LOS ANGELES, CALIFORNIA, ASSIGNOR OF ONE-THIRD TO ARTHUR D. COLE, OF MINNEAPOLIS, MINNESOTA.

CONTROL MECHANISM FOR OPERATING VEHICLES.

Application filed February 12, 1918, Serial No. 216,725. Renewed April 30, 1923.

*To all whom it may concern:*

Be it known that I, DAVID F. GEIGER, a citizen of the United States, residing at Los Angeles, in the county of Los Angeles and State of California, have invented a new and useful Improvement in Control Mechanism for Operating Vehicles, of which the following is a specification.

This invention relates to control mechanism for operating vehicles from a distance, the primary object being to provide simple and effective means for controlling or manipulating the moving parts of tractors and other vehicles with less manual labor and more effectively than heretofore.

More particularly this invention is applicable for use in connection with flexible lines for driving tractors, but it will be understood that the invention is equally applicable for use in other ways and to other classes of vehicles than the particular exemplification of the invention which is described in the following specification.

In the accompanying drawings forming part of this specification, Fig. 1 is a plan of a detail of a tractor showing my invention applied thereto; Fig. 2 is a detail of the prime mover which is employed on the tractor illustrated in Fig. 1, portions thereof being broken away and in section, a portion of the section being taken on the line 2—2 of Fig. 3; Fig. 3 is a section taken on the line 3—3 of Fig. 2, the electrical circuits employed with my invention being shown diagrammatically applied thereto and the switch element which is carried by the line being shown in longitudinal section; Fig. 4 is a perspective of the driving gear of the governor, and Fig. 5 is a perspective of the governor spindle.

In the drawings, I have illustrated my invention applied for use with a tractor, 3 and 4 representing in Fig. 1 the main drive wheels, which are mounted upon the axle 55, said axle being carried by the main frame 56 of the vehicle. C indicates the prime mover by which the wheels 3 and 4 are driven, said prime mover being an internal combustion engine having the usual drive shaft 57, to the opposite ends of which driving clutch members 58 are connected. Co-operating with these driving clucth members are the usual driven clutch members 59 of the clutches A and B, said driven clutch members being slidably mounted upon the driven stub shafts 60, so as to impart motion to the sets of gearings 61 in the usual manner by which the wheels 3 and 4 are driven either forwardly or backwardly. The driven clutch members 59 are shifted into and out of operation by means of the bell crank levers 62 and 63, one arm of each of said members being connected with the driven member of one of the clutches and the other arm 63 connected by a rod 64 with one of the shift levers 65 or 66, said shift levers being connected to the opposite ends of a line 2 extending backwardly to within reach of an operator for manipulation in moving the driven clutch members out of operative connection with the driving clutch members. Normally the members of the clutches are engaged, so as to drive the vehicle forwardly or backwardly by the prime mover, but when the line 2 is pulled on either side, the side or end portion so pulled releases the clutch on that side, allowing the other clutch to remain in closed operative connection, thus causing the wheel on the side of the vehicle on which the clutch is closed to revolve and move the vehicle around the opposite wheel, which is not driven as a pivot to effect steering of the vehicle. Should both ends of the line be pulled, both clutches are disengaged, and the power disconnected, allowing the vehicle to stop.

The prime mover C has the usual fuel manifold 39 by which hydrocarbon fuel mixture from the carburetter is conveyed to the cylinders of the engine. This fuel manifold contains the usual butterfly valve 38 (see Fig. 2), which is turned by the crank arm 37 to regulate its position and adjust the amount of fuel mixture which is admitted by the manifold from the carburetter into the engine, and the engine is also provided with the usual magneto J driven by the magneto shaft 19, which receives motion from the cam shaft of the engine not shown through the use of a cam shaft gear 21 and a pinion 20, which is carried upon the magneto shaft. The shaft 19 is journaled in a suitable housing 68, which is mounted on the engine casing, said housing also containing the gear 20. This gear which constitutes part of governor F is formed with suitable pairs of lugs 69, upon which governor arms 70 passing through slots 70' are pivoted, said governor arms having suitable members 71, which co-act with the end of a thrust spindle 72 to force the spindle backwardly and forwardly on the hub 73 of gear 20 in slots or channels 73'. The spindle is rotatably connected with the crank trunnion 33, which is mounted upon the shaft 34, said shaft being suitably journaled in the housing 68 and carrying a crank 35, which is connected to the crank arm 37 (see Fig. 2), by the connecting rod 36, thereby regulating through the operation of the governor according to the speed of the shaft 19, the position of the butterfly valve 38, and the amount of fuel mixture admitted into the engine. The inner end of the shaft 19 is keyed to hub 73 and carries a thrust pin 32, the operation of which will be hereinafter described and the other end portion of said shaft carries a friction spool 18, between the sides 17 and 51 of which a friction pinion 16 is arranged on a shaft 14, said shaft being revolubly mounted in a trunnion bearing 15, which is pivoted on the arm 74 of the housing. The end of the shaft 14 carrying the friction pinion is slidably mounted by the bearing 75 in the slotted arm 76 of the housing, so that the shaft 14 may be swung on its pivot and the friction pinion forced with its periphery against either one of the inner surfaces of the sides 17 and 51, thereby imparting revolving motion to the shaft 14 in either direction, according to which surface 17 or 51 the friction pinion is forced into contact against. The end of the shaft 14 which is journaled in the trunnion 15 carries a pulley 77 over which a belt 26 is arranged, said belt also passing around another pulley 25, which is mounted upon a screw controlling shaft 22, the latter being journaled within the housing 68. Thus by the mechanism described forward or backward motion is imparted to the screw shaft 22 according to which side of the friction spool, the friction pinion 16 is forced into contact against or the shaft 22 is stopped when the friction pinion is moved into median position between said sides. The screw shaft 22 is engaged by its threads with a shift block 23 in the housing, said shift block carrying an antifriction roller 31 on its side. During the movement or travel of the shift block along the screw shaft, the antifriction roller 31 presses down against a leaf spring 30, which is fastened by the bolt 79 in the housing and presses by its free end against the end of the thrust pin 32, thereby gradually releasing or increasing the tension of said spring and regulating the force exerted against the outer end of the thrust pin 32. The thrust pin 32 during its movement varies the position of the spindle 72 irrespective of the movement imparted by the governor, and thus positively opens or closes the butterfly valve 38 during its movement.

Mounted upon the flexible line 2 by which the operation of the vehicle is controlled is an electric control switch D, which is arranged, so that it can be manipulated by the driver. This control switch has an outer insulating cylindrical casing 80, (see Fig. 3), containing an electrical contact plate 7 and push pieces 53, 5 and 45. The push piece 53 when depressed tilts a contact arm 41 out of contact with the plate 7, a spring 81 being arranged to urge the contact piece 41 normally against said plate. The push piece 5 when depressed urges a spring contact piece 6 down into contact with the plate 7, the normal released position of the contact piece 6 being out of connection with the plate 7. The push piece 45 when depressed urges the contact piece 50 into connection with the plate 7 and this contact piece normally is urged out of contact with said plate. Thus three switches are contained within the control switch, one being normally closed and two normally open. The line 2 is in the form of an electrical conductor suitably attached to the control switch D and containing suitable conductors 11, 12, 40 and 49. A suitable battery E is provided, one side of which is connected to the conductor 12, said side being also grounded at 82 on the frame of the machine. The other side of the battery E is connected by a split circuit with the ends of two solenoid coils 8 and 46 containing the electromagnet 13, which is influenced thereby and mounted upon the shaft 14, so that when a circuit is completed through the coil 8, the friction pinion 16 is urged against one side of the friction spool 18 and when the circuit is completed through the other coil 46, it is urged against the other side.

Arranged on the housing are two electrical switches H and I. The switch H has a movable terminal 10 insulated from the housing and disposed with a contact pin 84 insulated from said terminal and slidably projecting through and into the housing and attached to the spring 29. The spring 29 is secured to the housing and serves to urge the terminal 10 normally into contact with another terminal 85, which is insulated from but secured to said housing. The switch I has a terminal 28, which is insulated from but mounted upon a pin 86 which slides through and into said housing, and is attached to the spring 27, which is mounted upon the housing and normally urges the contact terminal 28 into contact with the terminal 87, which is insulated from but secured to said housing. The springs 27 and 29 are arranged in the path of the roller 31, so that when the shift block is moved backwardly and forwardly by the revolution of the screw shaft 22, the switches H and I are automatically opened and closed as will be hereinafter described. The terminal member 6 of the switch element D is connected by the conductor 11 with the terminal 10 of switch H and the terminal 85 of switch H is connected by the conductor 9 with one end of the solenoid coil 8. The terminal 50 in the switch element D is connected by the line 49 with the terminal 87 of the switch element I, and the terminal 28 of switch I is connected by the conductor 47 with one end of the other solenoid coil 46. The main contact plate 7 of the switch element D is connected by the conductor 40 with the main terminal 88 of the magneto J, it being understood that the distributing terminals of the magneto are connected with the terminals of the usual spark plugs 90 in the cylinders of the engine in the usual manner, such as conductors 91 for ignition purposes.

In operation the flexible line 2 is employed in the usual manner for actuating clutches A and B, that is by pulling the left hand end of the line 2, while the right hand end is released, the clutch A is drawn into disengaging position, allowing the right hand clutch B to cause the traction wheel 3 to be driven forwardly and turn the vehicle to the left about traction wheel 4, as a pivot, and vice versa by pulling the right hand portion of the line and releasing the left hand portion, the opposite steering effect is produced, that is the vehicle is turned about the traction wheel 3 as a pivot. When the entire driving line is released, both clutches are in engaged position, and the vehicle is driven straight ahead by the revolution of both traction wheels. If both end portions of the line are pulled backwardly, both clutches are disengaged, thus disconnecting the power from the prime mover C and allowing the vehicle to stop. During these operations, the electric control switch D can be operated from a distance to simultaneously stop and regulate the speed of the prime mover, which as illustrated is an internal combustion engine. When it is desired to operate the internal combustion engine slowly, so as to propel the vehicle slowly, the push button 5 is depressed, thereby making connection between the push piece 6 and metal contact plate 7 in the switch. This operation produces the following action:

Starting with battery E current passes through the solenoid coil 8, line 9, switch H, line 11, contact elements 6 and 7, and line 12, back to battery. This causes the magnet 13 within the solenoid coil 8 to move the shaft 14 on its trunnion connection 15 and move the friction pinion 16 against the friction surface 17 of the friction spool 18, which is driven by the magneto shaft 19. As the magneto shaft revolves continuously by the gear 20, which is in mesh with the usual cam shaft gear 21 of the engine, the shaft 14 in consequence is revolved in a direction which will cause the screw controlling shaft 22 to turn in a direction which will move the shift block 23 upwardly through the connection produced by the drive sheaves 77 and 25 and belt 26. As a result, the shift block 23 automatically releases the spring switch arm 27 and causes the switch I to close, and at the end of its movement depresses the spring switch arm 29 and opens the switch 10 and its connected circuit. During this operation the tension of the spring 30 is gradually released, as the antifriction roller 31 travels upwardly along said spring. This action gradually releases the tension against the thrust pin 32, which allows the governor F which is driven by the magneto shaft 19 to gradually swing the crank trunnion 33, and move the shaft 34, crank arm 35, connecting rod 36, crank arm 37 and butterfly valve 38 in the fuel manifold 39 of the engine, this operation gradually moving said valve in position to reduce the amount of gas admitted into the engine cylinders, and thereby gradually reduce the speed of the engine. While this operation is occurring, the magneto circuit continues normally, that is the circuits from the magneto leading to the spark plugs of the engine are operated in their normal manner, the ground side of the circuit from the magneto being conducted through the line wire 40, contact piece 7, spring pressed switch arm 41, line 12 to the usual ground on the engine frame, this part of the circuit not being interrupted through the operation of the push button 5.

When the push button 45 is depressed, the speed of the engine is gradually increased and the following circuit is completed. Current passes from the battery E to the solenoid coil 46, line 47, switch 28, line 49, push piece 50, contact plate 7, line 12, back to battery E. This action draws the shaft 14 with its friction pinion 16 out of contact with the friction surface 17 and into contact with the friction surface 51 of the friction drum 18, thus causing the screw shaft 22 to be reversed in revolution and causing the shift block 23 to move downwardly upon the screw shaft. This movement releases the spring actuating arm 29, and closes the switch H and upon the shift block 23 reaching the lower end of said screw shaft, the switch I is opened as illustrated in Fig. 3. As this operation occurs, the tension upon the leaf spring 30 is increased, thereby thrusting the pin 32 inwardly against the centrifugal force of the governor F, and causing the butterfly valve 38 to be gradually opened until reaching fully open position according to the speed of the engine. In consequence the speed of the engine is gradually increased. The speed of the motor can be regulated at any degree desired, between slow and fast positions. By releasing the push button, which is being held down, between the extreme positions which the shift block 23 is adapted to assume, the screw shaft 22 can be stopped and the shift block 23 held stationary between the ends of the screw shaft, causing the tension upon the leaf spring 30 to be regulated and held in regulated position and the consequent adjusting of the butterfly valve 38 in the desired position at which the speed of the engine is to be maintained. In other words as soon as current is cut off from the solenoid coils, the friction pinion is released into neutral position.

When it is desired to stop the engine, the push button 53 is depressed, thereby breaking the circuit through the magneto, and causing the engine to stop. Should at any time the line accidentally break, the engine will immediately stop and thereby reduce the hazard of accidents.

This invention can be used with other systems of ignition and where ignition systems are not employed. It can also be used efficiently independently of internal combustion engines.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. In combination with a self propelled vehicle having an internal combustion engine prime mover, traction wheels driven by said prime mover, a flexible line actuated control for operatively effecting the connection between said prime mover and said traction wheels, electrically actuated means for controlling the gas admitted to regulate the speed and operation of said prime mover and means carried by said line for manipulating the operation of said electrically actuated means.

2. In combination with a self propelled vehicle having an internal combustion engine prime mover, traction wheels driven by said prime mover, a clutch interposed between each wheel and said prime mover whereby either or both wheels may be driven to drive and steer the vehicle, a line connected with the clutches for operating the same from a distance, and electrical means carried by the line for controlling the amount of gas admitted to the prime mover whereby the speed of operation of the engine and steering the vehicle can be controlled through said line.

3. In combination with a self propelled vehicle having an internal combustion engine prime mover, traction wheels driven by said prime mover, a flexible line actuated control for effecting the connection between said prime mover and wheels, electrically actuated means for controlling the admission of gas to said engine to regulate the speed of the operation of said prime mover and means associated with said line control for controlling the operation of said electrically actuated means.

4. In combination with a self propelled vehicle having an internal combustion engine prime mover, traction wheels driven by said prime mover, a clutch interposed between each wheel and said prime mover whereby either or both wheels may be driven to drive and steer the vehicle, a line connected with the clutches for operating the same from a distance, adjustable means for regulating or shutting off the supply of gas to the prime mover, and electrical means carried by the line for controlling the operation of said adjustable means.

5. In combination with a self propelled vehicle having an internal combustion engine prime mover, traction wheels driven by said prime mover, a flexible line actuated control for effecting the connection between said prime mover and wheels, adjustable means for admitting gas into said engine electrically actuated means for regulating said adjustable means to control the speed of said prime mover, and means carried by said line control and remotely distanced from said prime mover for controlling the operation of said electrically actuated means.

6. In combination with a self propelled vehicle having an internal combustion engine prime mover, traction wheels driven by said prime mover, a flexible line actuated control for effecting the connection between said prime mover and wheels, adjustable means for admitting gas into said engine electrically actuated means for regulating said adjustable means, and means remotely distanced from said prime mover for controlling the operation of said electrically actuated means.

7. In combination with a self propelled vehicle having an internal combustion engine prime mover, traction wheels driven by said prime mover, a flexible line actuated control for effecting the connection between said prime mover and wheels, adjustable means for admitting gas into said engine electrically actuated means for regulating said adjustable means, and an electrical switch remotely distanced from said prime mover and carried by the line of said control for controlling the operation of said electrically actuated means.

8. In combination with a self propelled vehicle having an internal combustion engine prime mover, traction wheels driven by said prime mover, a flexible line actuated control for effecting the connection between said prime mover and wheels, adjustable means for admitting gas into said engine electrically actuated means for gradually changing said adjustable means to regulate the speed of said prime mover, and an electrical switch remotely distanced from said prime mover and carried by the line of said control for controlling the operation of said electrically actuated means.

9. In combination with a self propelled vehicle having an internal combustion engine prime mover, traction wheels driven by said prime mover, a flexible line actuated control for effecting the connection between said prime mover and wheels, adjustable means for supplying gas to said engine electrically actuated means for regulating said adjustable means to stop or change the speed of said prime mover, and an electrical switch carried by the line of said control for controlling the operation of said electrically actuated control.

In testimony whereof, I have signed my name to this specification.

DAVID F. GEIGER.